US012735336B2

(12) United States Patent
Liu et al.

(10) Patent No.: US 12,735,336 B2
(45) Date of Patent: Sep. 15, 2026

(54) SYSTEM AND METHOD FOR TREATING NITRATE NITROGEN SEWAGE BY CONSTRUCTED WETLAND

(71) Applicant: SOUTHERN UNIVERSITY OF SCIENCE AND TECHNOLOGY, Shenzhen (CN)

(72) Inventors: Junguo Liu, Shenzhen (CN); Tao Huang, Shenzhen (CN)

(73) Assignee: SOUTHERN UNIVERSITY OF SCIENCE AND TECHNOLOGY, Shenzhen (CN)

( * ) Notice: Subject to any disclaimer, the term of this patent is extended or adjusted under 35 U.S.C. 154(b) by 360 days.

(21) Appl. No.: 18/435,022

(22) Filed: Feb. 7, 2024

(65) Prior Publication Data

US 2024/0279097 A1 Aug. 22, 2024

(30) Foreign Application Priority Data

Feb. 21, 2023 (CN) ......................... 202310185981.0

(51) Int. Cl.
*C02F 3/30* (2023.01)
*C02F 3/34* (2023.01)

(52) U.S. Cl.
CPC .............. *C02F 3/306* (2013.01); *C02F 3/341* (2013.01); *C02F 2209/02* (2013.01); *C02F 2209/16* (2013.01); *C02F 2209/22* (2013.01); *C02F 2209/44* (2013.01)

(58) Field of Classification Search
CPC ...... C02F 3/306; C02F 3/341; C02F 2209/02; C02F 2209/16; C02F 2209/22; C02F 2209/44; C02F 1/281; C02F 1/283; C02F 3/302; C02F 2101/163; C02F 3/305; C02F 3/327; C02F 3/32; C02F 3/28; C02F 2101/16; Y02W 10/10
USPC ................................. 210/602, 513, 601, 611
See application file for complete search history.

(56) References Cited

U.S. PATENT DOCUMENTS 6,592,761 B2 * 7/2003 Wofford .................... C02F 3/04
52/741.12
2012/0024780 A1 * 2/2012 Carr ........................ C02F 3/046
210/150

FOREIGN PATENT DOCUMENTS

CN 114516705 A * 5/2022 ................ C02F 9/00

* cited by examiner

*Primary Examiner* — Madeline Gonzalez
(74) *Attorney, Agent, or Firm* — Maier & Maier, PLLC

(57) ABSTRACT

A system for treating nitrate nitrogen sewage by autotrophic denitrification subsurface flow constructed wetland and a method thereof. The system includes a wetland pool body, a wetland substrate, a water distribution device, a water outlet device, and plants. The wetland substrate is filled in the wetland pool body. The wetland substrate includes pyrite, volcanic rock, and biochar. The water distribution device is located at the top of the wetland pool body to distribute water into the wetland pool body, and the water outlet device is located at the bottom of the wetland pool body to collect treated sewage. The plant is planted in the wetland substrate. The dissolved oxygen concentration of the system for treating nitrate nitrogen sewage by autotrophic denitrification subsurface flow constructed wetland is maintained at 1.2~2.8 mg/L.

13 Claims, 1 Drawing Sheet

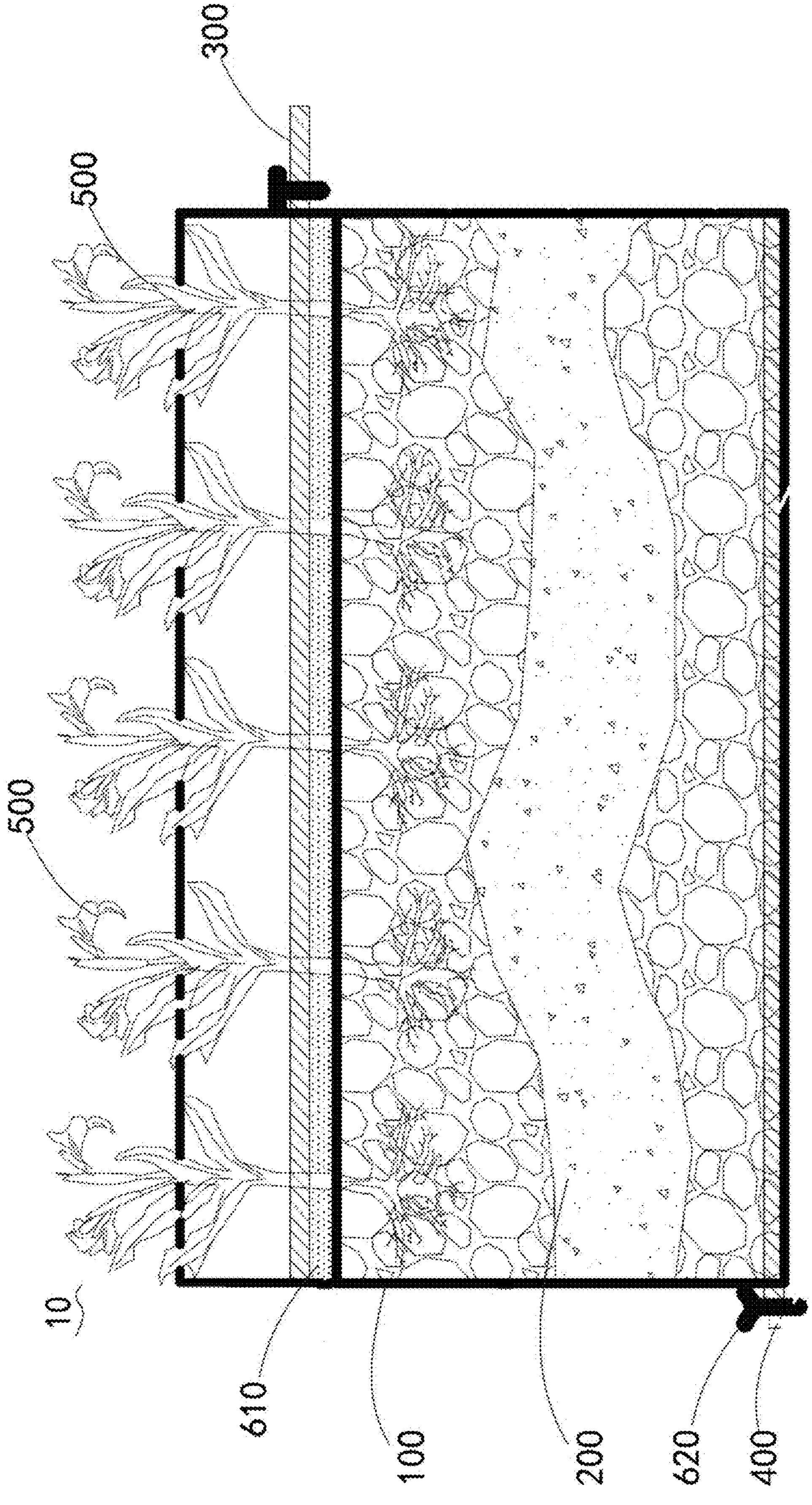
300
500
500
10
610
100
200
620
400

SYSTEM AND METHOD FOR TREATING NITRATE NITROGEN SEWAGE BY CONSTRUCTED WETLAND

CROSS-REFERENCE TO RELATED APPLICATIONS

The present application claims priority to Chinese patent application No. 202310185981.0, filed on Feb. 21, 2023, the content of all of which is herein incorporated by reference.

TECHNICAL FIELD

The present disclosure relates to the technical field of water environment treatment, in particular to a system for treating nitrate nitrogen sewage by autotrophic denitrification subsurface flow constructed wetland and a method thereof.

BACKGROUND

As a new sewage treatment process, constructed wetlands are mainly utilized to degrade pollutants by biodegradation, physical adsorption and chemical transformation. Generally speaking, constructed wetlands include three categories: vertical subsurface flow constructed wetlands, subsurface flow constructed wetlands, and horizontal subsurface flow constructed wetlands. The above three methods can purify water from different sources synergistically or independently, but none of them can achieve a good treatment performance for sewage rich in nitrate nitrogen. In one aspect, the traditionally constructed wetlands mainly rely on the anaerobic heterotrophic denitrification process, which completely reduces nitrogen oxides, especially nitrate nitrogen, of sewage to nitrogen gas. This process needs to supplement organic carbon sources as electron donors to strengthen the anaerobic heterotrophic denitrification reaction, so as to solve the problem of insufficient carbon sources in the traditional constructed wetlands heterotrophic anaerobic denitrification reaction. In another aspect, the content of nitrate nitrogen in sewage is much higher than that of ammonia nitrogen and nitrite nitrogen, which intensifies the dependence on heterotrophic anaerobic denitrification process. At the same time, other heterotrophic bacteria compete with heterotrophic denitrifying bacteria for organic matter as carbon source, which makes it more difficult for nitrate nitrogen to be completely reduced to nitrogen gas through heterotrophic denitrification process. Based on the above, the performance of constructed wetlands in treating sewage rich in nitrate nitrogen depends on the supply of organic carbon sources. In addition, plant residues or physically intercepted particulate matter gather on the surface and inside the pores of constructed wetlands. If it is left untreated for a long time, it leads to a local anaerobic microenvironment, reduces the permeability of constructed wetlands, and with the accumulation of the extracellular polymers, large particulate matter is condensed and adsorbed, and the blockage phenomenon of substrate pore is accelerated.

SUMMARY

Based on the above, in the traditional sewage treatment process, plant residues are accumulated on the surface and inside the pores of constructed wetlands. Prolonged operation of the traditional sewage treatment process leads to a local anaerobic microenvrionment and reduces the permeability of the constructed wetland. More importantly, for the treatment of sewage or secondary effluent with nitrate nitrogen, the lack of organic carbon sources prevents nitrate nitrogen from being completely reduced to nitrogen gas. However, the addition of organic carbon sources accelerates the secretion of extracellular polymers, making them absorb and intercept large particulate matter. In order to solve this problem, the present disclosure provides a system for treating nitrate nitrogen sewage by autotrophic denitrification subsurface flow constructed wetland. The system for treating nitrate nitrogen sewage by autotrophic denitrification subsurface flow constructed wetland does not rely on anaerobic heterotrophic denitrification reaction to remove nitrate nitrogen, and meanwhile ensures the purification effect of nitrate nitrogen and operates efficiently for a long time.

In one embodiment of the present disclosure, a system for treating nitrate nitrogen sewage by autotrophic denitrification subsurface flow constructed wetland is provided.

The system for treating nitrate nitrogen sewage by autotrophic denitrification subsurface flow constructed wetland, includes a wetland pool body, a wetland substrate, a water distribution device, a water outlet device, and plants. The wetland substrate is filled in the wetland pool body. The wetland substrate includes pyrite, volcanic rock, and biochar. The water distribution device is located at a surface of the wetland substrate, and the influent water entering the wetland pool body by the water distribution device enters the wetland pool body and flows out by gravity. The water outlet device is located at the bottom of the wetland pool body. The plant is planted in the wetland substrate. The dissolved oxygen concentration of the system for treating nitrate nitrogen sewage by autotrophic denitrification subsurface flow constructed wetland is maintained at 1.2~2.8 mg/L to construct a dissolved oxygen environment which is conducive to growth and metabolism of autotrophic denitrifying bacteria and not conducive to the growth of heterotrophic anaerobic denitrifying bacteria. When the system for treating nitrate nitrogen sewage by autotrophic denitrification subsurface flow constructed wetland is running, by controlling the hydraulic retention time, the nitrate nitrogen in the influent can be fully contacted with autotrophic denitrifying bacteria and reduced to nitrogen gas.

In some embodiments, the system for treating nitrate nitrogen sewage by autotrophic denitrification subsurface flow constructed wetland further includes a filter device. The filter device includes a gravel filter layer and a Y-type filter. The gravel filter layer is arranged on the surface of the wetland substrate. The thickness of the gravel filter layer is 2~5 cm. The Y-type filter is arranged at the water outlet device.

In some embodiments, the volume ratio of pyrite, volcanic rock, and biochar is (1~5):(1~5):(1~5).

Optionally, in one embodiment, the volume ratio of pyrite, volcanic rock, and biochar is 1:1:1.

In some embodiments, the water distribution device includes a plurality of water distributors. The plurality of water distributors is distributed at intervals. Each of the plurality of water distributors includes a plurality of holes.

In some embodiments, the system for treating nitrate nitrogen sewage by autotrophic denitrification subsurface flow constructed wetland further includes at least one of the following technical features:

An interval between the adjacent water distributors is 0.1~0.3 m;

A length of each water distributor is 0.5~1 m;

An interval between the adjacent holes is 5~8 cm, and an aperture of each hole is 1~2 cm.

In some embodiments, the system for treating nitrate nitrogen sewage by autotrophic denitrification subsurface flow constructed wetland further includes at least one of the following technical features:

A height of the wetland substrate is 25~35 cm;

A height of the wetland pool body is 35~45 cm;

A particle size of the wetland substrate is 1~3 cm.

In some embodiments, the system for treating nitrate nitrogen sewage by autotrophic denitrification subsurface flow constructed wetland further includes at least one of the following technical features:

A planting density of the plant is 16~20 trees per square meter;

The plant is selected from one or more of *Canna, Arundo Donax, Iris*, and *Cyperus Involucratus* Rottboll.

In some embodiments, a preparation method for the wetland substrate includes:

Preparing biochar;

Soaking raw materials of pyrite with 1 mol hydrochloric acid for 1~2 hours, then air-drying in the shade, and screening particle size to obtain the pyrite;

Soaking raw materials of volcanic rock with 1 mol hydrochloric acid for 1~2 hours, then air-drying in the shade, and screening particle size to obtain the volcanic rock.

In some embodiments, the step of the preparing the biochar includes: roasting one or more of bamboo, *Arundo Donax*, and *Iris* in a muffle furnace at 300° C.~400° C., cooling and then crushing to form the biochar;

And/or, particle sizes of the pyrite, the volcanic rock, and the biochar are in the range of 1~3 cm respectively to increase the specific surface area.

In another embodiment, a method for treating nitrate nitrogen sewage by autotrophic denitrification subsurface flow constructed wetland is provided.

A method for treating nitrate nitrogen sewage by autotrophic denitrification subsurface flow constructed wetland, comprising:

Providing an oxygen environment by plant for the system for treating nitrate nitrogen sewage by autotrophic denitrification subsurface flow constructed wetland;

Making sewage enter the wetland pool body by the water distribution device, and the nitrate nitrogen in the sewage is reduced to nitrogen gas by *Thiobacillus;*

Ammonia nitrogen in the sewage is oxidized to generate nitrite nitrogen and nitrate nitrogen; the pyrite and the volcanic rock provide ferrous ions to react with the nitrite nitrogen to generate the nitrogen gas, and the pyrite and the volcanic rock provide sulfide to promote the growth of sulfur-reducing bacteria *Desulfovibrio, Desulfobulbus* and *Thiobacillus*. *Desulfovibrio* and *Desulfobulbus* reduce nitrate nitrogen to ammonia nitrogen by using sulfide and/or organic matter as electron donor, the reduction products of the ammonia nitrogen are oxidized to nitrite nitrogen and nitrate nitrogen again, and the *Thiobacillus* uses sulfur as the electron donor to completely reduce nitrate nitrogen to nitrogen gas or reduce part of the nitrate nitrogen to ammonia nitrogen;

Biochar enhances an interspecific electron transfer, promotes growth and metabolism of sulfur-reducing bacteria *Desulfovibrio* and *Desulfobulbus*, and promotes *Thiobacillus* to reduce nitrate nitrogen to nitrogen gas. Biochar also improves the growth and metabolism of *Geobacter*, increases the reaction intensity of heterogeneous nitrate nitrogen reduction to ammonia nitrogen, and competitively inhibits an anaerobic heterotrophic denitrification process.

In some embodiments, a total nitrogen concentration of the sewage is not more than 30 mg/L, a hydraulic retention time is 2~6 hours, and a control temperature is more than 10° C.

In some embodiments, a dissolved oxygen concentration of the system for treating nitrate nitrogen sewage by autotrophic denitrification subsurface flow constructed wetland is controlled to 1.2~2.8 mg/L.

The above-mentioned system for treating nitrate nitrogen sewage by autotrophic denitrification subsurface flow constructed wetland, by controlling the structure and substrate composition of the wetland pool body, can obtain autotrophic denitrifying bacteria by in-situ cultivation, improve the metabolism of autotrophic denitrifying bacteria, strengthen the chemical reaction between ferrous ion and nitrite nitrogen, and inhibit the potential metabolism of heterotrophic denitrifying bacteria, so as to reduce the nitrogen oxides entering in the system into nitrogen gas by both autotrophic denitrifying bacteria and chemical reaction to entering the environment. The present disclosure can efficiently degrade pollutants, has simple operation, is easy to implement, does not need power and an additional carbon source, has no strict requirements on operating conditions, and can realize the sulfur autotrophic denitrification reaction under set conditions. The redox reaction between ferrous ion and nitrite nitrogen, as well as the competitive inhibition of *Geobacter* to anaerobic heterotrophic denitrifying bacteria, realize the biological denitrification process with autotrophic denitrification as the main part in the subsurface constructed wetland and can be used to remove nitrate nitrogen in the secondary effluent of sewage factory without supplementing organic carbon and additional power. In addition, the present disclosure can be used in wetland parks, purifying rainwater and landscape water, bringing more ecological benefits and providing a place for people to have a rest.

The above-mentioned method for treating nitrate nitrogen sewage by autotrophic denitrification subsurface flow constructed wetland, based on the existing subsurface flow constructed wetland, promotes the growth and metabolism of sulfur autotrophic denitrifying bacteria by controlling the substrate height, pool body height, substrate composition and ratio of the subsurface flow constructed wetland, and utilizes the competitive advantage of *Geobacter* to heterotrophic anaerobic denitrifying bacteria to inhibit the growth of anaerobic heterotrophic denitrifying bacteria, so that, nitrate nitrogen is not reduced through heterotrophic denitrification process, thus promoting the growth of autotrophic denitrifying bacteria. At the same time, the ammonia nitrogen generated by the reduction of nitrate nitrogen by *Geobacter* is oxidized to nitrate nitrogen again due to the high dissolved oxygen concentration (1.2~2.8 mg/L) in this constructed wetland system, and thus is further reduced to nitrogen gas by autotrophic denitrifying bacteria. In addition, the rich ferrous ion in the substrate gradation can strengthen the reduction reaction between ferrous ion and nitrite nitrogen. Further, nitrite nitrogen is directly reduced to nitrogen gas through a chemical reaction. Through the above measures, sulfur autotrophic denitrifying bacteria and *Geobacter* are obtained by in-situ cultivation, sulfur autotrophic denitrifying bacteria perform autotrophic denitrification, and *Geobacter* inhibits the growth and metabolism of heterotrophic denitrifying bacteria, and indirectly provides nitrate nitrogen for the former, and can also perform chemical reduction reaction between ferrous ion and nitrite nitrogen to further reduce nitrogen oxides to nitrogen gas. In addition, by maintaining a high dissolved oxygen concentration, the present disclosure reduces the accumulation of organic matter, improves the porosity of the wetland and prolongs the service life of the wetland.

In the present disclosure, for sewage types with nitrate nitrogen concentration not more than 30 mg/L, such as the secondary effluent of sewage factory with nitrate nitrogen as the main part, the present disclosure can adapt to the flow variation of the secondary effluent, and nitrate nitrogen can be completely reduced to nitrogen gas with high efficiency at the same time, so as to achieve the following beneficial effects: (1) competitive inhibition for heterotrophic denitrifying bacteria by *Geobacter*; (2) nitrate nitrogen is mainly reduced by sulfur autotrophic denitrifying bacteria, which makes the system maintain a high nitrate nitrogen removal effect; (3) in the chemical reduction reaction between ferrous ion and nitrite nitrogen, ferrous ion is used as an electron donor without the participation of microorganisms; (4) microorganisms such as *Geobacter* and sulfur autotrophic denitrifying bacteria are obtained by in-situ enrichment cultivation.

BRIEF DESCRIPTION OF THE DRAWINGS

In order to more clearly explain the technical schemes in the embodiments of the present disclosure, the accompanying drawings needed in the descriptions of the embodiments are shown below. Obviously, the drawings in the following description are only some embodiments of the present disclosure, and other drawings can be obtained according to these drawings without creative labor for those skilled in the art.

For a more complete understanding of the present disclosure and its beneficial effects, the following is described in combination with the accompanying drawings. Among them, the same attached drawings mark in the following description indicate the same part.

FIG. 1 is a schematic diagram of a system for treating nitrate nitrogen sewage by autotrophic denitrification subsurface flow constructed wetland of one embodiment of the present disclosure.

DETAILED DESCRIPTION OF THE EMBODIMENTS

In order to make the above purposes, features, and advantages of the present disclosure more obvious and understandable, embodiments of the present disclosure are explained in detail in combination with the drawings. Many specific details are stated in the following description to facilitate the full understanding of the present disclosure. However, the present disclosure can be implemented in many other ways different from those described herein, and those skilled in the art can make similar improvements without violating the connotation of the present disclosure, so that the present disclosure is not limited by the specific embodiments disclosed below.

In the following description, it should be understood that the terms "center", "longitudinal", "horizontal", "length", "width", "thickness", "up", "down", "front", "rear", "left", "right", "vertical", "level", "top", "bottom", "inside", "outside", "clockwise", "counterclockwise", "axial", "radial", "peripheral" are based on the orientation or position relationship shown in the attached drawings, only used for facilitating the description of the present disclosure and simplifying the description, rather than indicating or implying that the device or element must have a specific orientation, be constructed and operate in a specific orientation. Therefore, it cannot be understood as a limitation on the present disclosure.

Moreover, the terms "first", "second" are used only for descriptive purposes and cannot be understood as indicating or implying relative importance or implicitly indicating the number of technical characteristics indicated. Thus, the features limited with "first" or "second" may explicitly or implicitly include at least one of the features. In the description of the present disclosure, "multiple" means at least two, such as two, three, etc., unless otherwise specified.

In the present disclosure, unless otherwise clearly specified and limited, the terms "installation", "connection", "connected", "fixed", etc. should be broadly understood, for example, it may be a fixed connection, or a detachable connection, or integrated connection; it may be a mechanical connection, or an electrical connection; it may be a direct connection, or an indirect connection through an intermediate medium, or an internal communication of two components or an interaction relationship between the two components, unless otherwise clearly limited. For those skilled in the art, the specific meaning of the above terms in the present disclosure can be understood according to specific circumstances.

In the description of the present disclosure, "a plurality of" means more than one, "several" or "multiple" are more than two, "greater", "less", and "more" are understood as excluding the number, and "above", "below", and "within" are understood as including the number. The "first" and "second" are described only for the purpose of distinguishing the technical characteristics, they cannot be understood as indicating or implying the relative importance or implicitly indicating the number of the indicated technical features or the sequence of the indicated technical features.

Unless otherwise defined, all technical and scientific terms used herein have the same meaning as commonly understood by those ordinary skilled in the art to which the present disclosure belongs. The terms used herein in the description of the present disclosure are for the purpose of describing specific embodiments only, and are not intended to limit the present disclosure. As used herein, the term "and/or" includes any combinations of one or more of the associated listed items.

In one embodiment of the present disclosure, a system 10 for treating nitrate nitrogen sewage by autotrophic denitrification subsurface flow constructed wetland is provided to solve the problem that in the traditional sewage treatment process, plant residues accumulate on the surface and inside the pores of the constructed wetland, which leads to a local anaerobic microenvironment and reduces the permeability of the constructed wetland when it is left untreated for a long time, and with the accumulation of extracellular polymers, large particulate matter is condensed and adsorbed, the blockage of substrate pores is accelerated. The following description is combined with the attached drawings.

In one embodiment of the present disclosure, a system 10 for treating nitrate nitrogen sewage by autotrophic denitrification subsurface flow constructed wetland is provided. For example, as shown in FIG. 1, FIG. 1 is a schematic diagram of the system 10 for treating nitrate nitrogen sewage by autotrophic denitrification subsurface flow constructed wetland of one embodiment of the present disclosure. The system 10 can be used to treat sewage with rich nitrate nitrogen.

To more clearly explain the structure of the system 10 for treating nitrate nitrogen sewage by autotrophic denitrification subsurface flow constructed wetland, the system 10 is introduced in combination with the attached drawings.

For example, as shown in FIG. 1, FIG. 1 is a schematic diagram of the system 10 for treating nitrate nitrogen sewage by autotrophic denitrification subsurface flow constructed wetland of one embodiment of the present disclosure, the system includes a wetland pool body 100, a wetland substrate 200, a water distribution device 300, a water outlet device 400, and plant 500.

The wetland substrate 200 is filled in the wetland pool body 100. The wetland substrate 200 includes pyrite, volcanic rock, and biochar. The water distribution device 300 is arranged on the surface of the wetland substrate 200 to distribute influent water into the wetland pool body 100, and the influent water entering through the water distribution device 300 enters the wetland pool body 100 and flows by gravity. The water outlet device 400 is located at the bottom of the wetland pool body 100. The plant 500 is planted in the wetland substrate 200. The dissolved oxygen concentration of the system 10 for treating nitrate nitrogen sewage by autotrophic denitrification subsurface flow constructed wetland is maintained at 1.2~2.8 mg/L to construct a dissolved oxygen environment which is beneficial to autotrophic denitrifying bacteria and not conducive to the growth of heterotrophic anaerobic denitrifying bacteria. When the system 10 for treating nitrate nitrogen sewage by autotrophic denitrification subsurface flow constructed wetland is running, by controlling the hydraulic retention time, the nitrate nitrogen in the influent water can be fully contacted with autotrophic denitrifying bacteria and reduced to nitrogen gas.

In the present disclosure, the ammoniacal nitrogen in sewage is oxidized to generate nitrite nitrogen and nitrate nitrogen, and then pyrite and volcanic rock provide ferrous ions to react with nitrite nitrogen to generate nitrogen gas, and pyrite and volcanic rock provide sulfides to promote the growth of sulfur-reducing bacteria *Desulfovibrio, Desulfobulbus*, and *Thiobacillus*. Among them, *Desulfovibrio* and *Desulfobulbus* can reduce nitrate nitrogen by using sulfide and/or organics as electron donors, and their reduction products of ammonia nitrogen can be oxidized to nitrite nitrogen and nitrate nitrogen again, while *Thiobacillus* can use sulfur as an electron donor to completely reduce nitrate nitrogen to nitrogen gas, or reduce part of nitrate nitrogen to ammonia nitrogen. Biochar can enhance the interspecific electron transfer, promote the growth and metabolism of sulfur-reducing bacteria *Desulfovibrio* and *Desulfobulbus*, and promote *Thiobacillus* to reduce nitrate nitrogen to nitrogen gas. Biochar can also improve the growth and metabolism of *Geobacter*, increase the reaction intensity of reducing heterogeneous nitrate nitrogen to ammonia nitrogen, and competitively inhibit the anaerobic heterotrophic denitrification process. Therefore, the biological reduction process of nitrogen oxides does not depend on anaerobic heterotrophic denitrifying bacteria, so it is unnecessary to add additional organic carbon as an electron donor.

In some embodiments, the system 10 for treating nitrate nitrogen sewage by autotrophic denitrification subsurface flow constructed wetland further includes a filter device. The filter device includes a gravel filter layer 610 and a Y-type filter 620. The gravel filter layer 610 is arranged on the surface of the wetland substrate 200. The thickness of the gravel filter layer 610 is 2~5 cm. The Y-type filter 620 is arranged on the water outlet device 400. Specifically, the Y-type filter 620 can be selected from the Y-type filter 620. The gravel filter layer 610 can be replaced periodically to prevent the surface from being blocked.

In some embodiments, the volume ratio of pyrite, volcanic rock, and biochar is (1~5):(1~5):(1~5).

Optionally, in one embodiment, the volume ratio of pyrite, volcanic rock, and biochar is 1:1:1.

In some embodiments, the water distribution device 300 includes a plurality of water distributors. The plurality of water distributors is distributed with intervals, an interval between the adjacent water distributors is 0.1~0.3 m, a length of each water distributor is 0.5~1 m, and each water distributor includes a plurality of holes, an interval between the adjacent holes is 5~8 cm, and an aperture of each hole is 1~2 cm. When using the water distributors, it is only necessary to control the inlet water temperature to be higher than 10° C.

In some embodiments, the water outlet device 400 can be a water outlet pipe. The length of the water outlet pipe can be set according to the length of the water distributor.

In some embodiments, the water distributor can be a DN75 water distributor. The water outlet pipe can be a DN50 water collection pipe. Optionally, the diameter of the water distributor and/or water outlet pipe is DN50-DN175. Specifically, the diameter of the water distributor and/or water outlet pipe can be selected according to the actual hydraulic load.

In some embodiments, the height of the wetland substrate 200 is 25~35 cm. For example, in a specific embodiment, the height of the wetland substrate 200 is 25 cm; in another specific embodiment, the height of the wetland substrate 200 is 35 cm.

In some embodiments, the height of the wetland pool body 100 is 35~45 cm. For example, in a specific embodiment, the height of the wetland pool body 100 is 35 cm; in another specific embodiment, the height of the wetland pool body 100 is 45 cm.

In some embodiments, the particle size of the wetland substrate 200 is 1~3 cm. For example, in a specific embodiment, the particle size of the wetland substrate 200 is 1 cm; in another specific embodiment, the particle size of the wetland substrate 200 is 3 cm.

In some embodiments, the planting density of the plant 500 is 16~20 trees per square meter. The planting density of the plant 500 can be set as required. Optionally, in one embodiment, the planting density of the plant 500 is 16 trees per square meter, and in another embodiment, the planting density of the plant 500 is 20 trees per square meter.

In some embodiments, the plant 500 is selected from the group consisting of *Canna, Arundo Donax, Iris*, and *Cyperus Involucratus* Rottboll.

In some embodiments, the preparation method for the wetland substrate 200 includes:

One or more of bamboo, *Arundo Donax*, and *Iris* are roasted in a muffle furnace at 300° C.~400° C., cooled and crushed to form biochar.

In some embodiments, the particle size of the pyrite, the volcanic rock and the biochar is controlled in the range of 1~3 cm respectively to increase the specific surface area.

The raw materials of pyrite are soaked with 1 mol hydrochloric acid for 1~2 hours, then air-dried in the shade, and the particle size is screened to obtain pyrite.

The raw materials of volcanic rock are soaked in 1 mol hydrochloric acid for 1~2 hours, then air-dried in the shade, and the particle size is screened to obtain volcanic rock.

The above-mentioned system 10 for treating nitrate nitrogen sewage by autotrophic denitrification subsurface flow constructed wetland, by controlling the structure and substrate composition of the wetland pool body 100, can obtain autotrophic denitrifying bacteria by in-situ cultivation, improve the metabolism of autotrophic denitrifying bacteria, strengthen the chemical reaction between ferrous ions and nitrite nitrogen, and inhibit the metabolism of potential heterotrophic denitrifying bacteria, to reduce the nitrogen oxides entering the system 10 into nitrogen gas through autotrophic denitrifying bacteria and chemical reaction to entering the environment. The present disclosure can efficiently degrade pollutants, has simple operation, is easy to implement, does not need power and an additional carbon source, has no strict requirements on operating conditions, and can realize the sulfur autotrophic denitrification reaction under set conditions. The redox reaction between ferrous ion and nitrite nitrogen, as well as the competitive inhibition of *Geobacter* to anaerobic heterotrophic denitrifying bacteria, realize the biological denitrification process with autotrophic denitrification as the main part in the subsurface constructed wetland, and can be used to remove nitrate nitrogen in the secondary effluent of sewage factory without supplementing organic carbon and additional power. In addition, the present disclosure can be used in wetland parks, purifying rainwater and landscape water, bringing more ecological benefits and providing a place for people to have a rest.

In another embodiment, a method for treating nitrate nitrogen sewage by autotrophic denitrification subsurface flow constructed wetland is provided.

A method for treating nitrate nitrogen sewage by autotrophic denitrification subsurface flow constructed wetland, includes:

- Providing an oxygen environment by the plant 500 for the system 10 for treating nitrate nitrogen sewage by autotrophic denitrification subsurface flow constructed wetland;
- Making sewage enter the wetland pool body 100 through the water distribution device 300, and reducing the nitrate nitrogen in the sewage to nitrogen gas by *Thiobacillus*; among them, the *Thiobacillus* reduces part of the nitrate nitrogen to nitrite nitrogen and ammonia nitrogen;
- Ammonia nitrogen in the sewage is oxidized to generate nitrite nitrogen and nitrate nitrogen; pyrite and volcanic rock provide ferrous ions to react with nitrite nitrogen to generate nitrogen gas, and the pyrite and the volcanic rock provide sulfide to promote the growth of sulfur-reducing bacteria *Desulfovibrio, Desulfobulbus* and *Thiobacillus*. *Desulfovibrio* and *Desulfobulbus* reduce nitrate nitrogen by using sulfide and/or organic matter as electron donors, and their reduction products of ammonia nitrogen can be oxidized to nitrite nitrogen and nitrate nitrogen again, while *Thiobacillus* can use sulfur as electron donor to completely reduce nitrate nitrogen to nitrogen gas or reduce part of nitrate nitrogen to ammonia nitrogen;
- Biochar can enhance the interspecific electron transfer, promote the growth and metabolism of sulfur-reducing bacteria *Desulfovibrio* and *Desulfobulbus*, and promote *Thiobacillus* to reduce nitrate nitrogen to nitrogen gas. Biochar can also improve the growth and metabolism of *Geobacter*, increase the reaction intensity of reducing heterogeneous nitrate nitrogen to ammonia nitrogen, and competitively inhibit the anaerobic heterotrophic denitrification process.

In some embodiments, the total nitrogen concentration of the sewage is not more than 30 mg/L; the hydraulic retention time is 2~6 hours, and the control temperature is more than 10° C. The whole operation process of the system of the present disclosure does not need power drive, and the fluid flows from the water distributor to the water outlet pipe under the gravity flow effect. In addition, *Thiobacillus, Desulfovibrio*, and *Desulfobulbus* have good adaptability to dissolved oxygen concentration, so as to strengthen dissolved oxygen concentration, to relieve the surface blockage, and to prolong the service life of autotrophic denitrification surface undercurrent constructed wetland, by changing changing the full-water/dry-wet conditions. In the present disclosure, for sewage types with nitrate nitrogen concentration not more than 30 mg/L, such as the secondary effluent of sewage factory with nitrate nitrogen as the main part, the present disclosure can adapt the flow variation of the nitrate nitrogen, and can completely reduce the nitrate nitrogen to nitrogen gas with high efficiency at the same time, so as to achieve the following beneficial effects: (1) competitive inhibition of *Geobacter* to heterotrophic denitrifying bacteria; (2) nitrate nitrogen is mainly reduced by sulfur autotrophic denitrifying bacteria, which makes the system maintain a high nitrate nitrogen removal effect; (3) in the chemical reduction reaction between ferrous ion and nitrite nitrogen, ferrous ion is used as an electron donor without the participation of microorganisms; (4) microorganisms such as *Geobacter* and Sulfur Autotrophic Denitrifying Bacteria are obtained by in-situ enrichment cultivation.

In some embodiments, the dissolved oxygen concentration of the system 10 for treating nitrate nitrogen sewage by autotrophic denitrification subsurface flow constructed wetland is maintained at 1.2~2.8 mg/L.

Embodiment 1

In one embodiment, a method for treating nitrate nitrogen sewage by autotrophic denitrification subsurface flow constructed wetland was provided. In the embodiment, the treatment object was Dinggang Lake in Shenzhen, Guangdong Province, and the secondary effluent of sewage factory was used as the main water supplement. The chemical oxygen demand in the influent water was 20.4~30.6 mg/L, nitrate nitrogen was 9.3~11.3 mg/L, and total phosphorus was 4.2~4.6 mg/L. A system 10 for treating nitrate nitrogen sewage by autotrophic denitrification subsurface flow constructed wetland was set at the secondary effluent inlet of the Dinggang Lake.

The system 10 for treating nitrate nitrogen sewage by autotrophic denitrification subsurface flow constructed wetland included a wetland pool body 100, a wetland substrate 200, a water distribution device 300, a water outlet device 400, and plant 500. The wetland substrate 200 was filled in the wetland pool body 100. The height of the wetland pool body 100 was 40 cm, the length of the wetland pool body 100 was 100 cm, and the width of the wetland pool body 100 was 200 cm. The wetland substrate 200 included pyrite, volcanic rock and biochar. One or more of bamboo, *Arundo Donax* and *Iris* were roasted at 350° C. in a muffle furnace, cooled and crushed to form biochar. The particle size of the pyrite, the volcanic rock and the biochar was controlled in the range of 2 cm respectively to increase the specific surface area. The raw materials of pyrite were soaked with 1 mol hydrochloric acid for 1 hour, then air-dried in the shade, and the particle size was screened to obtain pyrite. The raw materials of volcanic rock were soaked in 1 mol hydrochloric acid for 1 hour, then air-dried in the shade, and the particle size was screened to obtain volcanic rock. The particle size of the wetland substrate 200 was 2 cm. The volume ratio of the pyrite, the volcanic rock and the biochar was 1:1:1. The pyrite, the volcanic rock and the biochar were mixed together to obtain a mixture and filled the mixture in the wetland pool body 100 until a height of the wetland substrate 200 was 30 cm.

The water distribution device 300 was arranged at the top of the wetland pool body 100 to distribute water into the wetland pool body 100 and the water outlet device 400 was arranged at the bottom of the wetland pool body 100 to collect the treated sewage. The water distribution device 300 included a plurality of water distributors. The plurality of water distributors was distributed with intervals, the interval between the adjacent water distributors was 0.2 m, the length of each water distributor was 0.5 m, and each water distributor included a plurality of holes, the interval between the adjacent holes was 5 cm, and the aperture of each hole was 1 cm. When using the water distributors, the influent water temperature was controlled to be higher than 10° C. The water distributors were the DN75 water distributors and the water outlet pipes were DN50 water collection pipes.

The plant 500 of *Cyperus Involucratus* Rottboll was planted in the wetland substrate 200, and the planting density of the plant 500 was 16 trees per square meter.

The gravel filter layer 610 was arranged on the surface of the wetland substrate 200. The thickness of the gravel filter layer 610 was 3 cm. The Y-type filter 620 was arranged on the water outlet device 400. The Y-type filter 620 was selected from the Y-type filter 620.

In the embodiment, the hydraulic retention time was set to 4 hours, the total nitrogen concentration of sewage was not more than 30 mg/L, and the control temperature was more than 10° C.

The method for treating nitrate nitrogen sewage by autotrophic denitrification subsurface flow constructed wetland was implemented, which included the following steps:

Providing an oxygen environment of the system 10 for treating nitrate nitrogen sewage by autotrophic denitrification subsurface flow constructed wetland by the plant 500;

Making the sewage enter the wetland pool body 100 through the water distribution device 300, and the nitrate nitrogen in the sewage was reduced to nitrogen gas by *Thiobacillus;*

Ammonia nitrogen in the sewage was oxidized to generate nitrite nitrogen and nitrate nitrogen; the pyrite and the volcanic rock provided ferrous ion to react with nitrite nitrogen to generate nitrogen gas, and the pyrite and the volcanic rock provided sulfide to promote the growth of sulfur-reducing bacteria *Desulfovibrio, Desulfobulbus* and *Thiobacillus. Desulfovibrio* and *Desulfobulbus* reduced nitrate nitrogen by sulfide and/or organic matter as electron donors, and their reduction product of ammonia nitrogen was oxidized to nitrite nitrogen and nitrate nitrogen again, while *Thiobacillus* used sulfur as electron donor to completely reduce nitrate nitrogen to nitrogen gas or reduce part of nitrate nitrogen to ammonia nitrogen;

Biochar enhanced the interspecific electron transfer, promoted the growth and metabolism of sulfur-reducing bacteria *Desulfovibrio* and *Desulfobulbus*, and promoted *Thiobacillus* to reduce nitrate nitrogen to nitrogen gas. Biochar also improved the growth and metabolism of *Geobacter*, increased the reaction intensity of reducing heterogeneous nitrate nitrogen to ammonia nitrogen, and competitively inhibited the anaerobic heterotrophic denitrification process.

After a period of operation, in the system of the present disclosure, the relative abundance of *Thiobacillus* fluctuated within the range of 2.66%~4.36%, that of *Desulfobulbus* was 0.753%~1.01%, and that of *Desulfovibrio* was 0.615%~1.43%, while that of *Geobacter* was 1.06%~1.54%, and that of *Thauera*, the main denitrifying bacterium, was 0.71%~1.43%, which meant that the sulfur autotrophic denitrification process was the main nitrate nitrogen removal mechanism. After 120 days of operation monitoring, the removal rate of nitrate nitrogen was in the range of 52.3%~78.9%, the removal efficiency of total phosphorus was in the range of 43.2%~82.6%, and the removal rate of total chemical oxygen demand was in the range of 47.3%~73.6%.

Embodiment 2

In the Embodiment 2, a laboratory simulation of the system 10 for treating nitrate nitrogen sewage by autotrophic denitrification subsurface flow constructed wetland was set up. In the Embodiment 2, the system 10 for treating nitrate nitrogen sewage by autotrophic denitrification subsurface flow constructed wetland is substantially the same as that in Embodiment 1, except that, the height of the wetland pool body 100 was 40 cm, the length of the wetland pool body 100 was 20 cm, and the width of the wetland pool body 100 was 40 cm; the volume ratio of the pyrite, the volcanic rock and the biochar was 2:2:1; the hydraulic retention time was set to 24 hours; the total chemical oxygen demand in the influent water was 3 mg/L, ammonia nitrogen was 15 mg/L, nitrate nitrogen was 10 mg/L. Other process parameters were the same as those used in Embodiment 1.

During the whole experiment, water samples were taken every 7 days to determine the contents of the total nitrogen, the chemical oxygen demand, and the ammonia nitrogen, and the corresponding effluent water quality could meet the four-class standard of surface water environmental quality (GB 3838-2002). In addition, in the microbial community, the relative abundance of *Thiobacillus* was 2.4%~4.3%, that of *Desulfovibrio* was 1.12%~2.17%, and that of *Desulfobulbus* was 1.67%~2.46%, the relative abundance of *Geobacter* was 0.4%~1.1%, the relative abundance of *Thauera*, the main anaerobic denitrifying bacterium, was 0.7%~1.2%. The system 10 for treating nitrate nitrogen sewage by autotrophic denitrification subsurface flow constructed wetland simulated in the laboratory of the Embodiment 2 could meet the requirement of treating nitrate nitrogen sewage.

Embodiment 3

In the Embodiment 3, a laboratory simulation of the system 10 for treating nitrate nitrogen sewage by autotrophic denitrification subsurface flow constructed wetland was set up. In the Embodiment 3, the system 10 for treating nitrate nitrogen sewage by autotrophic denitrification subsurface flow constructed wetland is substantially the same as that in Embodiment 1, except that, the height of the wetland pool body 100 was 40 cm, the length of the wetland pool body 100 was 20 cm, and the width of the wetland pool body 100 was 40 cm; the volume ratio of the pyrite, the volcanic rock and the biochar was 2:2:1; the hydraulic retention time was set to 24 hours; the total chemical oxygen demand in the influent water was 3 mg/L, ammonia nitrogen was 35 mg/L, nitrate nitrogen was 10 mg/L. Other process parameters were the same as those used in Embodiment 1.

During the whole 120 days experiment, water samples were taken every 7 days to determine the contents of the chemical oxygen demand, ammonia nitrogen and total nitrogen, and the corresponding effluent water quality could meet the four-class standard of surface water environmental quality (GB 3838-2002). In addition, in the microbial community, the relative abundance of *Thiobacillus* was 0.7%~4.37%, that of *Desulfovibrio* was 0.0582%~1.43%, and that of *Desulfobulbus* was 0.0514%~1.02%, the relative abundance of *Geobacter* was 0.3%~0.9%, the relative abundance of *Thauera*, the main anaerobic denitrifying bacterium, was 0.161%~1.53%. The system 10 for treating nitrate nitrogen sewage by autotrophic denitrification subsurface flow constructed wetland simulated in the laboratory of the Embodiment 3 could meet the requirement of treating nitrate nitrogen sewage.

To sum up, the above-mentioned method for treating nitrate nitrogen sewage by autotrophic denitrification subsurface flow constructed wetland, based on the existing subsurface flow constructed wetland, promotes the growth and metabolism of sulfur autotrophic denitrifying bacteria by controlling the substrate height, pool body height, substrate composition and ratio of the subsurface flow constructed wetland, and utilizes the competitive advantage of *Geobacter* to heterotrophic anaerobic denitrifying bacteria to inhibit the growth of anaerobic heterotrophic denitrifying bacteria, so that, nitrate nitrogen is not reduced through heterotrophic denitrification process, thus promoting the growth of autotrophic denitrifying bacteria. At the same time, the ammonia nitrogen generated by the reduction of nitrate nitrogen by *Geobacter* is oxidized to nitrate nitrogen again due to the high dissolved oxygen concentration (1.2~2.8 mg/L) in this constructed wetland system and is further reduced to nitrogen gas by autotrophic denitrifying bacteria. In addition, the rich ferrous ion in the substrate gradation can strengthen the reduction reaction between ferrous ion and nitrite nitrogen. Further, nitrite nitrogen is directly reduced to nitrogen gas through chemical reaction. Through the above measures, sulfur autotrophic denitrifying bacteria and *Geobacter* are obtained by in-situ cultivation, sulfur autotrophic denitrifying bacteria perform autotrophic denitrification. *Geobacter* inhibits the growth and metabolism of heterotrophic denitrifying bacteria, and indirectly provides nitrate nitrogen for the former, and can also perform chemical reduction reaction between ferrous ion and nitrite nitrogen to further reduce nitrogen oxides to nitrogen gas. In addition, by maintaining a high dissolved oxygen concentration (1.2~2.8 mg/L), the present disclosure reduces the accumulation of organic matter, improves the porosity of the wetland and prolongs the service life of the wetland.

Compared with the prior art, the present disclosure has the following beneficial effects:

(1) By controlling the height of wetland pool body 100 and the height of the wetland substrate 200, planting the plant 500 with higher density, and strengthening the oxygen exchange process between the interface of the wetland substrate 200 and the air, as well as the oxygen secretion of the roots of the plant 500, the reoxygenation level of the whole subsurface constructed wetland process is improved.

(2) Good denitrification effect is achieved, and the denitrification percent reaches 50%~80%, and there is no need to add organic matter as an electron donor. Ammonia nitrogen entering the system of the present disclosure is nitrated to generate nitrite nitrogen and nitrate nitrogen, and nitrite nitrogen can be reduced to nitrogen gas by reacting with ferrous ion, and nitrate nitrogen is reduced to nitrogen gas by autotrophic denitrifying bacteria. Due to the competitive advantage of *Geobacter*, it is difficult for anaerobic heterotrophic denitrifying bacteria to obtain nitrate nitrogen needed for growth, and nitrogen oxides are mostly reduced to nitrogen gas by autotrophic denitrifying *Thiobacillus.*

(3) Substrate gradation plays a key role in in-situ cultivation of autotrophic denitrifying *Thiobacillus* and *Geobacter*. After treatment, pyrite and volcanic rock can provide sulfur as an electron donor to promote the growth of sulfur autotrophic denitrifying bacteria, and at the same time provide ion to promote the reaction between ferrous ion and nitrite nitrogen. More importantly, they can cooperate with biochar to significantly promote the reduction reaction of heterogeneous nitrate nitrogen, and increase the community number of *Geobacter* (by about 30%~60%). The combination of the three substrates according to a certain gradation and the reoxygenation level of the process itself can make the autotrophic denitrifying bacteria and the *Geobacter* be the dominant species in the microbial community (the relative abundance of the microbial community is 5%~8%), which is also the key for the present autotrophic denitrification to remove nitrate nitrogen.

(4) According to the principle of phosphorus absorption under aerobic condition and phosphorus release under anaerobic conditions, the activity of phosphorus-accumulating bacteria in the present disclosure can be maintained by adopting a higher reoxygenation level, that is, phosphorus entering the wetland pool body can be removed through the biological phosphorus removal process. In addition, it is also conducive to the oxidative decomposition of organic matter, reducing the blockage phenomenon possibly generated in the wetland substrate (the reduction percent is 20%~40%), improving the permeability of the constructed wetland, thus prolonging the service life of the constructed wetland and creating greater engineering and environmental value.

(5) By maintaining a high level of reoxygenation, the autotrophic denitrification subsurface flow constructed wetland changes the anaerobic environment required for normal metabolism of methanogenic bacteria, inhibits the metabolism of methanogenic bacteria (depending on dissolved oxygen concentration), and can reduce the methane produced in the process of purifying water, thus achieving the purpose of reducing greenhouse gas methane emission. In addition, autotrophic denitrifying bacteria reduces nitrate nitrogen and ferrous ion reduces nitrite nitrogen, which reduces the generation of greenhouse gas nitrous oxide during heterotrophic denitrification.

(6) The method of the present disclosure can thoroughly solve the problems that the constructed wetland of the prior art is not suitable for large-scale wetlands, or can not ensure good engineering effect, and the maintenance cost is high and the process is difficult. The method of the present disclosure is not only suitable for treating nitrate nitrogen sewage, such as secondary effluent of sewage factory, but also suitable for treating sewage containing nitrogen oxides such as rainwater and reclaimed water in wetland park and other environments, and good purification effect can be achieved by changing the operating conditions.

In the above-mentioned embodiments, the description of each embodiment has its own emphasis. For the parts not detailed in one embodiment, please refer to the relevant descriptions of other embodiments.

The technical features of the above-mentioned embodiments can be combined at will. In order to make the description concise, possible combinations of the technical features in the above-mentioned embodiments are not all described. However, as long as there is no contradiction between the combinations of these technical features, they should be considered as the scope recorded in this specification.

The above-mentioned embodiments only express several embodiments of the present disclosure, and their descriptions are more specific and detailed, but they cannot be understood as limitations of the present disclosure. It should be pointed out that for those skilled in prior art, without departing from the concept of the present disclosure, several modifications and improvements can be made, which belong to the protection scope of the present disclosure. Therefore, the protection scope of the present disclosure should be based on the claims.

What is claimed is:

1. A system for treating nitrate nitrogen sewage by autotrophic denitrification subsurface flow constructed wetland, the system comprising: a wetland pool body, a wetland substrate, a water distribution device, a water outlet device, and plant; the wetland substrate is filled in the wetland pool body; the wetland substrate comprises pyrite, volcanic rock and biochar; the water distribution device is located at a surface of the wetland substrate, and influent water entering the wetland pool body by the water distribution device flows out by gravity; the water outlet device is located at a bottom of the wetland pool body; the plant is planted in the wetland substrate; a dissolved oxygen concentration of the system for treating nitrate nitrogen sewage by autotrophic denitrification subsurface flow constructed wetland is maintained at 1.2~2.8 mg/L to construct a dissolved oxygen environment conducive to growth and metabolism of autotrophic denitrifying bacteria and not conducive to growth of heterotrophic anaerobic denitrifying bacteria; and, when the system for treating nitrate nitrogen sewage by autotrophic denitrification subsurface flow constructed wetland is running, by controlling a hydraulic retention time, nitrate nitrogen in the influent water is fully contacted with autotrophic denitrifying bacteria and reduced to nitrogen gas.

2. The system for treating nitrate nitrogen sewage by autotrophic denitrification subsurface flow constructed wetland according to claim 1, wherein the system further comprises a filter device; the filter device comprises a gravel filter layer and a Y-type filter; the gravel filter layer is arranged on the surface of the wetland substrate; a thickness of the gravel filter layer is 2~5 cm; the Y-type filter is arranged at the water outlet device.

3. The system for treating nitrate nitrogen sewage by autotrophic denitrification subsurface flow constructed wetland according to claim 1, wherein a volume ratio of the pyrite, the volcanic rock and the biochar is (1~5):(1~5):(1~5).

4. The system for treating nitrate nitrogen sewage by autotrophic denitrification subsurface flow constructed wetland according to claim 3, wherein the volume ratio of the pyrite, the volcanic rock and the biochar is 1:1:1.

5. The system for treating nitrate nitrogen sewage by autotrophic denitrification subsurface flow constructed wetland according to claim 1, wherein the water distribution device comprises a plurality of water distributors; the plurality of water distributors is distributed with intervals; and the plurality of water distributors is arranged with a plurality of holes.

6. The system for treating nitrate nitrogen sewage by autotrophic denitrification subsurface flow constructed wetland according to claim 5, wherein the system further comprises at least one of:

an interval between the adjacent water distributors is 0.1~0.3 m;

a length of each water distributor is 0.5~1 m; and/or an interval between the adjacent holes is 5~8 cm, and an aperture of each hole is 1~2 cm.

7. The system for treating nitrate nitrogen sewage by autotrophic denitrification subsurface flow constructed wetland according to claim 1, wherein the system further comprises at least one of:

a height of the wetland substrate is 25~35 cm;

a height of the wetland pool body is 35~45 cm; and/or a particle size of the wetland substrate is 1~3 cm.

8. The system for treating nitrate nitrogen sewage by autotrophic denitrification subsurface flow constructed wetland according to claim 1, wherein the system further comprises at least one of:

a planting density of the plant is 16~20 trees per square meter; and/or the plant is selected from the group consisting of *Canna, Arundo Donax, Iris*, and *Cyperus Involucratus* Rottboll.

9. The system for treating nitrate nitrogen sewage by autotrophic denitrification subsurface flow constructed wetland according to claim 1, wherein the wetland substrate is prepared by steps of:

preparing the biochar;

soaking raw materials of pyrite with 1 mol hydrochloric acid for 1~2 hours, then air-drying in shade, and screening based on particle size to obtain the pyrite;

soaking raw materials of volcanic rock with 1 mol hydrochloric acid for 1~2 hours, then air-drying in shade, and screening based on particle size to obtain the volcanic rock.

10. The system for treating nitrate nitrogen sewage by autotrophic denitrification subsurface flow constructed wetland according to claim 9, wherein the biochar is prepared by steps of:

roasting one or more of the group consisting of bamboo, the *Arundo Donax* and the *Iris* in a muffle furnace at 300° C.~400° C., cooling and then crushing to form the biochar; and/or controlling particle sizes of the pyrite, the volcanic rock and the biochar in a range of 1~3 cm respectively to increase a specific surface area.

11. The system for treating nitrate nitrogen sewage by autotrophic denitrification subsurface flow constructed wetland according to claim 1, wherein the system adopts a method comprising steps of:

providing an oxygen environment by plants;

making sewage enter the wetland pool body by the water distribution device, wherein nitrate nitrogen in the sewage is reduced to nitrogen gas by *Thiobacillus;* oxidizing ammonia nitrogen in the sewage to generate nitrite nitrogen and the nitrate nitrogen;

providing ferrous ion by the pyrite and the volcanic rock to react with the nitrite nitrogen to generate the nitrogen gas; wherein the pyrite and the volcanic rock provide sulfide to promote growth of *Desulfovibrio, Desulfobulbus* and *Thiobacillus*, the *Desulfovibrio* and the *Desulfobulbus* reduce the nitrate nitrogen to the ammonia nitrogen by using sulfide and/or organic matter as electron donor, the ammonia nitrogen is oxidized to the nitrite nitrogen and the nitrate nitrogen again, and the *Thiobacillus* uses sulfur as the electron donor to completely reduce the nitrate nitrogen to the nitrogen gas or reduce part of the nitrate nitrogen to the ammonia nitrogen; and enhancing an interspecific electron transfer by the biochar to promote growth and metabolism of the *Desulfovibrio* and the *Desulfobulbus*, and to promote the *Thiobacillus* to reduce the nitrate nitrogen to the nitrogen gas; wherein the biochar improves growth and metabolism of *Geobacter*, increase a reaction intensity of reducing heterogeneous nitrate nitrogen to ammonia nitrogen, and competitively inhibits an anaerobic heterotrophic denitrification process.

12. The system for treating nitrate nitrogen sewage by autotrophic denitrification subsurface flow constructed wetland according to claim 11, wherein a total nitrogen concentration of the sewage is not more than 30 mg/L, a hydraulic retention time of the sewage is 2~6 hours, and a control temperature of the sewage is more than 10° C.

13. The system for treating nitrate nitrogen sewage by autotrophic denitrification subsurface flow constructed wetland according to claim 11, wherein a dissolved oxygen concentration of the sewage is controlled to maintain at 1.2~2.8 mg/L.

* * * * *